United States Patent
Hong et al.

(10) Patent No.: US 11,915,392 B2
(45) Date of Patent: Feb. 27, 2024

(54) IMAGE ENHANCEMENT METHOD AND APPARATUS

(71) Applicant: SHANGHAI LINKCHIP SEMICONDUCTOR TECHNOLOGY CO., LTD., Shanghai (CN)

(72) Inventors: Ming Hong, Shanghai (CN); Rui Zhang, Shanghai (CN); Hengjie Lin, Shanghai (CN)

(73) Assignee: SHANGHAI LINKCHIP SEMICONDUCTOR TECHNOLOGY CO., LTD., Shanghai (CN)

( * ) Notice: Subject to any disclaimer, the term of this patent is extended or adjusted under 35 U.S.C. 154(b) by 342 days.

(21) Appl. No.: 17/440,261

(22) PCT Filed: Dec. 18, 2019

(86) PCT No.: PCT/CN2019/126273
§ 371 (c)(1),
(2) Date: Sep. 17, 2021

(87) PCT Pub. No.: WO2020/186848
PCT Pub. Date: Sep. 24, 2020

(65) Prior Publication Data
US 2022/0156890 A1    May 19, 2022

(30) Foreign Application Priority Data
Mar. 18, 2019 (CN) .......................... 201910203085.6

(51) Int. Cl.
*G06T 7/13*      (2017.01)
*G06T 5/00*      (2006.01)
(Continued)

(52) U.S. Cl.
CPC ................ *G06T 5/002* (2013.01); *G06T 5/10* (2013.01); *G06T 5/20* (2013.01); *G06T 7/13* (2017.01);
(Continued)

(58) Field of Classification Search
CPC .. G06T 5/002; G06T 5/10; G06T 5/20; G06T 7/13; G06T 7/90; G06T 7/60;
(Continued)

(56) References Cited

U.S. PATENT DOCUMENTS 7,257,273 B2 * 8/2007 Li ............................ G06T 7/12
382/199
7,676,103 B2 * 3/2010 Ali ......................... G06T 5/003
382/240

(Continued)

FOREIGN PATENT DOCUMENTS

| CN | 102156964 A | 8/2011 |
| CN | 104680485 A | 6/2015 |

(Continued)

OTHER PUBLICATIONS

Office Action dated Sep. 24, 2021 in Chinese Patent Application No. 201910203085.6.
(Continued)

*Primary Examiner* — Shefali D Goradia
(74) *Attorney, Agent, or Firm* — Venable LLP (57) ABSTRACT

An image enhancement method includes: acquiring an image in a YUV format (110); performing N max layers of wavelet decomposition on a brightness component and chrominance components respectively (120); starting from the (N max)th layer, performing wavelet reconstruction on the low frequency sub-bands of the chrominance components of each layer on which edge preserving filtering has been performed according to the low frequency sub-band of
(Continued)

the brightness component of the corresponding layer, and the high frequency sub-bands of the chrominance components continuously towards an upper layer until an image of an original size is obtained (130); performing, according to the brightness component, edge preserving filtering on the chrominance components that have been subjected to the wavelet reconstruction (140); integrating the chrominance components that have been subjected to the edge preserving filtering and the brightness component (150).

11 Claims, 6 Drawing Sheets

(51) Int. Cl.
*G06T 7/90* (2017.01)
*G06T 5/10* (2006.01)
*G06T 5/20* (2006.01)
*G06T 7/60* (2017.01)

(52) U.S. Cl.
CPC ............... *G06T 7/60* (2013.01); *G06T 7/90* (2017.01); *G06T 2207/10024* (2013.01); *G06T 2207/20028* (2013.01); *G06T 2207/20192* (2013.01)

(58) Field of Classification Search
CPC . G06T 2207/10024; G06T 2207/20028; G06T 2207/20192
See application file for complete search history.

(56) References Cited

U.S. PATENT DOCUMENTS

| | | | | |
|---|---|---|---|---|
| 9,111,339 | B1* | 8/2015 | Huang | G06T 5/002 |
| 10,803,552 | B2* | 10/2020 | Liang | G06T 3/4053 |
| 2006/0285767 | A1* | 12/2006 | Ali | G06T 5/003 |
| | | | | 348/E5.064 |
| 2010/0177249 | A1* | 7/2010 | Ali | H04N 5/142 |
| | | | | 348/625 |
| 2013/0071025 | A1 | 3/2013 | Jang et al. | |
| 2016/0173884 | A1 | 6/2016 | Le Leannec et al. | |

FOREIGN PATENT DOCUMENTS

| | | |
|---|---|---|
| CN | 105096280 A | 11/2015 |
| CN | 105243641 A | 1/2016 |
| CN | 105427257 A | 3/2016 |
| CN | 108259873 A | 7/2018 |
| CN | 109389560 A | 2/2019 |

OTHER PUBLICATIONS

Kun, Wu, "Color Image Enhancement Algorithm Based on Edge Preserving Filter", A Dissertation Submitted to University of Chinese Academy of Sciences in partial fulfillment of the requirement For the degree of Doctor of Engineering, Mar. 2017, 143 pages, Changchun Institute of Optics, Fine Mechanics and Physics, Chinese Academy of Sciences, Changchun, China.

International Search Report and Written Opinion dated Mar. 25, 2020 in International Application PCT/CN2019/126273.

* cited by examiner

IMAGE ENHANCEMENT METHOD AND APPARATUS

CROSS-REFERENCE TO RELATED APPLICATIONS

This application is a national stage of International Application No. PCT/CN2019/126273, filed on Dec. 18, 2019, which claims priority to Chinese Patent Application No. 201910203085.6, filed on Mar. 18, 2019. Both of the aforementioned applications are hereby incorporated by reference in their entireties.

TECHNICAL FIELD

The present disclosure relates to the field of image processing, and particularly, to an image enhancement method and apparatus.

BACKGROUND

With the gradual popularization of mobile phones, there is an increasing requirement for imaging quality. In order to meet the requirement, cameras equipped in the mobile phones have their resolution increased year by year, but the imaging quality is not greatly improved with the increase in resolution, particularly in an environment with dim light.

The camera needs to extend exposure time or increase signal amplification factor for the purpose of increasing brightness. Extending the exposure time will result in slower imaging, degrading user experience. As for increasing the signal amplification factor, noise (especially chrominance noise to which human eyes are sensitive) is amplified while a normal signal is amplified, which results in degraded image quality.

An imaging process of the camera is complex, to which noises at different frequencies will be introduced simultaneously to form a superimposed noise, and it is difficult to completely remove a majority of the noise by an ordinary bilateral filtering method alone. A wavelet transformation has relatively good time-division and frequency-division characteristics, and is widely used in the denoising field.

A common wavelet domain denoising method is to perform threshold shrinkage on each high frequency sub-band that has been subjected to the wavelet transformation, i.e., a wavelet threshold denoising method. However, this method depends on selection of thresholds, and because different decomposition scales and different high frequency sub-bands require different thresholds, once the thresholds are improperly selected, it is very easy to cause phenomena such as mosaic or edge oscillations of the denoised image due to the loss of a large number of high frequency components.

SUMMARY

A technical problem to be solved by the present disclosure is to provide an image enhancement method and apparatus to eliminate edge oscillations of an image and improve a denoising effect of the image.

To solve the above technical problem, an aspect of the present disclosure provides an image enhancement method, comprising: acquiring an image in a YUV format, separating a brightness component and chrominance components of the image in the YUV format; performing N max layers of wavelet decomposition on the brightness component and the chrominance components respectively to obtain, with respect to each layer, low and high frequency sub-bands of the brightness component, and low and high frequency sub-bands of the chrominance components, wherein N max is a positive integer greater than 1; starting from the (N max)th layer, performing wavelet reconstruction on the low frequency sub-bands of the chrominance components of each layer on which edge preserving filtering has been performed according to the low frequency sub-band of the brightness component of the corresponding layer, and the high frequency sub-bands of the chrominance components continuously towards an upper layer until an image of an original size is obtained; performing, according to the brightness component, edge preserving filtering on the chrominance components that have been subjected to the wavelet reconstruction; integrating the chrominance components that have been subjected to the edge preserving filtering and the brightness component.

In an embodiment of the present disclosure, the step of performing edge preserving filtering on the low frequency sub-bands of the chrominance components according to the low frequency sub-band of the brightness component of the corresponding layer comprises: calculating a weight according to the low frequency sub-band of the brightness component of the corresponding layer, and performing edge preserving filtering on the low frequency sub-bands of the chrominance components according to the weight.

In an embodiment of the present disclosure, the chrominance components include a U component and a V component, the edge preserving filtering is bilateral filtering, the step of performing edge preserving filtering on the low frequency sub-bands of the chrominance components according to the weight comprises:

$$U\_LL_N^0(x, y) = \frac{\sum_{i,j} U\_LL_N(x+i, y+j) * W_N(x+i, y+j)}{\sum_{i,j} W_N(x+i, y+j)} \quad (1)$$

$$V\_LL_N^0(x, y) = \frac{\sum_{i,j} V\_LL_N(x+i, y+j) * W_N(x+i, y+j)}{\sum_{i,j} W_N(x+i, y+j)} \quad (2)$$

where N is a current wavelet layer number, $1 \leq N \leq N$ max, and N is a natural number, (x,y) is a coordinate of a pixel, (i, j) is an offset in a window, $-WIN_N \leq i,j \leq WIN_N$, $WIN_N$ is a Gaussian kernel radius of the Nth layer, $U\_LL_N(x, y)$ is a low frequency sub-band of a U component pixel (x,y) of the Nth layer, $V\_LL_N(x, y)$ is a low frequency sub-band of a Y component pixel (x,y) of the Nth layer, $U\_LL_N(x+i, y+j)$, $V\_LL_N(x+i, y+j)$ are respectively pixel sets of the U, V component pixels $U\_LL_N(x, y)$, $V\_LL_N(x, y)$ taking the Gaussian kernel size $WIN_N$ as the radius, $W_N(x+i, y+j)$ is a corresponding weight.

In an embodiment of the present disclosure, the step of calculating a weight according to the low frequency sub-band of the brightness component of the corresponding layer comprises:

$$W_N(x+i, y+j) = WD_N(x+i, y+j) * WR_N(x+i, y+j) \quad (3)$$

$$WD_N(x+i, y+j) = \exp\left(-\frac{i^2 + j^2}{2\delta\_G_N^2}\right) \quad (4)$$

$$WR_N(x+i, y+j) = \begin{cases} EI_N(x+i, y+j) & EI_N(x+i, y+j) > 0 \\ 0 & EI_N(x+i, y+j) \leq 0 \end{cases} \quad (5)$$

-continued $$EI_N(x+i, y+j) = 16 - \frac{(Y\_LL_N(x+i, y+j) - Y\_LL_N(x, y))^2}{2\delta\_Y_N^2} - \frac{(U\_LL_N(x+i, y+j) - U\_LL_N(x, y))^2}{2\delta\_U_N^2} - \frac{(V\_LL_N(x+i, y+j) - V\_LL_N(x, y))^2}{2\delta\_V_N^2} \quad (6)$$

wherein $\delta\_G_N$ is a Gaussian kernel variance in an Nth-layer bilateral filtering, $\delta\_Y_N$, $\delta\_U_N$, and $\delta\_V_N$ are respectively Y, U, V component variances of the Nth layer, $WD_N(x+i, y+j)$ is a domain weight in the bilateral filtering, $WR_N(x+i, y+j)$ is a range weight in the bilateral filtering, $EI_N(x+i, y+j)$ is a comprehensive edge indicator, $Y\_LL_N(x, y)$ is a low frequency sub-band of a Y component pixel (x,y) of the Nth layer, $Y\_LL_N(x+i, y+j)$ is a pixel set of the Y component pixel $Y\_LL_N(x, y)$ taking the Gaussian kernel size $WIN_N$ as the radius.

In an embodiment of the present disclosure, the step of acquiring an image in a YUV format comprises: acquiring an image in a RGB format, converting the image in the RGB format into the image in the YUV format.

In an embodiment of the present disclosure, a Haar wavelet function is used for the wavelet decomposition and the wavelet reconstruction.

Another aspect of the present disclosure provides an image enhancement apparatus, comprising: an image acquisition unit configured to acquire an image in a YUV format and separate a brightness component and chrominance components of the image in the YUV format; a wavelet decomposition unit configured to perform N layers of wavelet decomposition on the brightness component and the chrominance components respectively to obtain, with respect to each layer, low and high frequency sub-bands of the brightness component, and low and high frequency sub-bands of the chrominance components, wherein N is a positive integer greater than 1; a wavelet reconstruction unit configured to, starting from the (N max)th layer, perform wavelet reconstruction on the low frequency sub-bands of the chrominance components of each layer on which edge preserving filtering has been performed according to the low frequency sub-band of the brightness component of the corresponding layer, and the high frequency sub-bands of the chrominance components continuously towards an upper layer until an image of an original size is obtained; an edge preserving filtering unit configured to perform, according to the brightness component, edge preserving filtering on the chrominance components that have been subjected to the wavelet reconstruction; an integration unit configured to integrate the chrominance components that have been subjected to the edge preserving filtering and the brightness component.

In an embodiment of the present disclosure, the wavelet reconstruction unit is configured to calculate a weight according to the low frequency sub-band of the brightness component of the corresponding layer, and perform edge preserving filtering on the low frequency sub-bands of the chrominance components according to the weight.

In an embodiment of the present disclosure, the image acquisition unit is configured to acquire an image in a RGB format, and convert the image in the RGB format into the image in the YUV format.

In an embodiment of the present disclosure, the wavelet decomposition unit is configured to perform wavelet decomposition by using a Haar wavelet function, the wavelet reconstruction unit is configured to perform wavelet reconstruction by using the Haar wavelet function.

Compared with the related art, the present disclosure has the following advantages: the present disclosure provides an image enhancement method and apparatus, wherein by performing wavelet decomposition on the image in the YUV format to obtain the low and high frequency sub-bands of the brightness component and the chrominance components of each layer, performing edge preserving filtering on the low frequency sub-bands of the chrominance components of each layer according to the low frequency sub-band of the brightness component of the corresponding layer, performing wavelet reconstruction continuously towards the upper layer until the image of the original size is obtained, the edge information of the low frequency sub-bands of the chrominance components can be effectively preserved and enhanced, the dependence on thresholds can be avoided, the edge oscillations of the image can be eliminated, the denoising effect of the image can be improved.

BRIEF DESCRIPTION OF THE DRAWINGS

In order to make the above objectives, features and advantages of the present disclosure more clear and comprehensible, specific implementations of the present disclosure will be described in detail below in conjunction with the accompanying drawings, in which.

DETAILED DESCRIPTION

In order to make the above objectives, features and advantages of the present disclosure more clear and comprehensible, specific implementations of the present disclosure will be described in detail below in conjunction with the accompanying drawings.

Many specific details are described in the following description in order to facilitate a thorough understanding of the present disclosure, but the present disclosure may be implemented in other ways different from those described herein, and thus the present disclosure is not limited to the specific embodiments disclosed below.

As shown in the present application and the claims, words such as "one", "a", "an", and/or "the" and the like do not specifically refer to the singular, but may also include the plural, unless the context explicitly indicates an exception.

In general, terms "include" and "comprise" only indicate that explicitly identified steps and elements are covered, whereas these steps and elements do not constitute an exclusive list, and other steps or elements may also be covered in a method or apparatus.

Although the present disclosure makes various references to certain modules in the system according to the embodiments of the present disclosure, any number of different modules may be used and operated on an imaging system and/or a processor. The modules are merely illustrative, and different aspects of the system and method may use different modules.

Flow diagrams are used in the present disclosure to illustrate operations performed by the system according to the embodiments of the present disclosure. It should be understood that the preceding or following operations are not necessarily performed exactly in order. Instead, various steps may be processed in reverse order or at the same time. Meanwhile, other operations may be added to these processes, or a certain operation or several operations may be removed from these processes.

Figure 1:
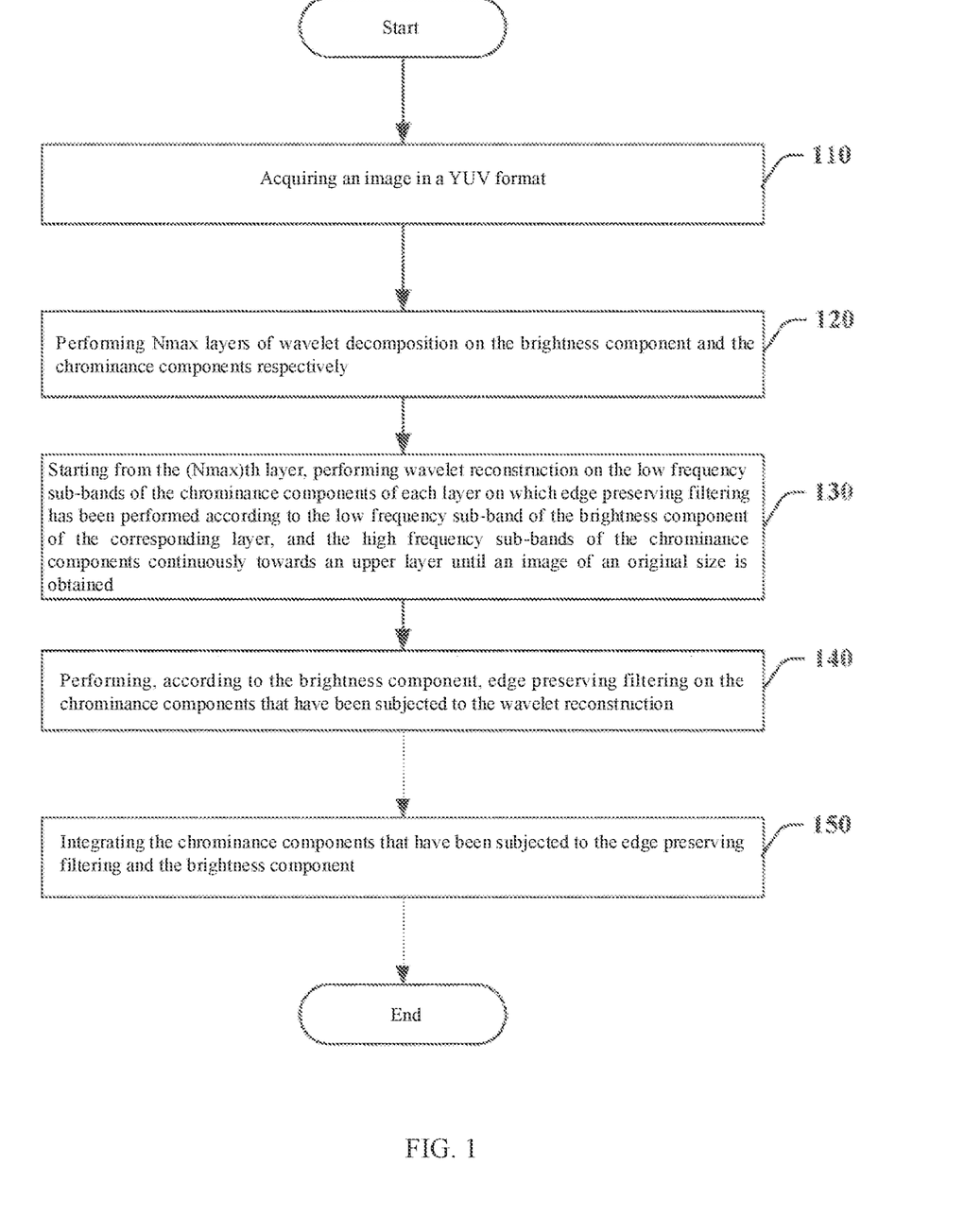
FIG. 1 is a flow diagram of an image enhancement method according to an embodiment of the present disclosure.

FIG. 1 is a flow diagram of an image enhancement method according to an embodiment of the present disclosure. Referring to FIG. 1, the image enhancement method comprises the following steps:

Step 110, acquiring an image in a YUV format.

Step 120, performing N max layers of wavelet decomposition on a brightness component and chrominance components respectively.

Step 130, starting from the (N max)th layer, performing wavelet reconstruction on the low frequency sub-bands of the chrominance components of each layer on which edge preserving filtering has been performed according to the low frequency sub-band of the brightness component of the corresponding layer, and the high frequency sub-bands of the chrominance components continuously towards an upper layer until an image of an original size is obtained.

Step 140, performing, according to the brightness component, edge preserving filtering on the chrominance components that have been subjected to the wavelet reconstruction.

Step 150, integrating the chrominance components that have been subjected to the edge preserving filtering and the brightness component.

Figure 2:
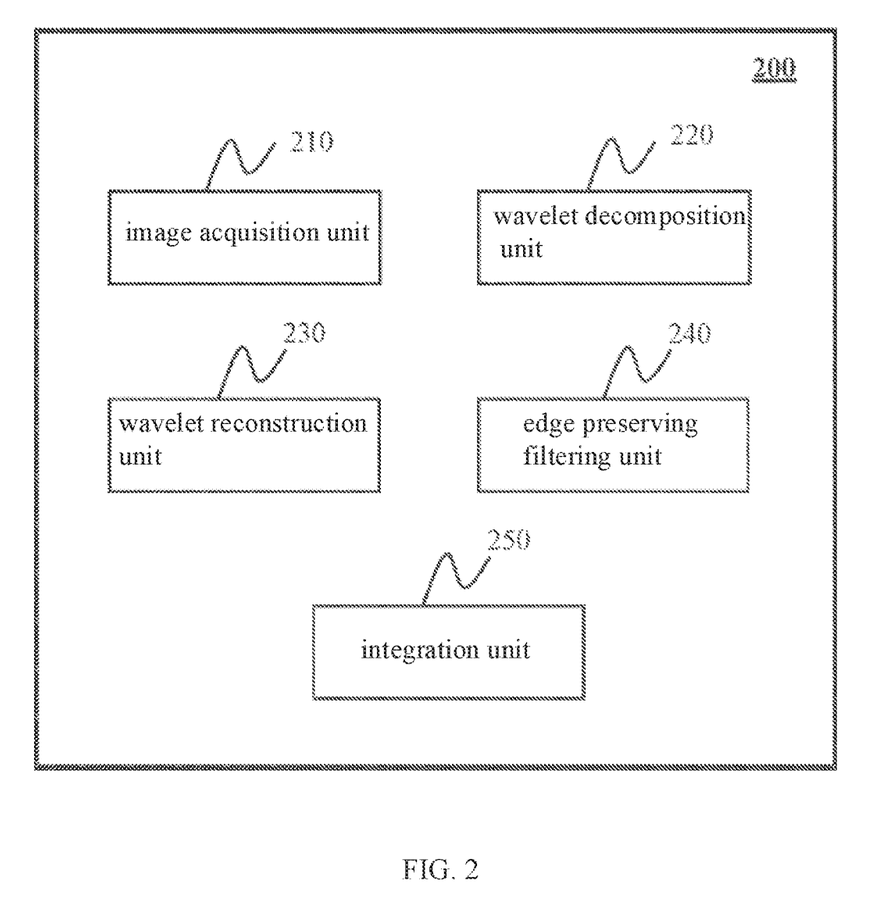
FIG. 2 is a structural schematic diagram of an image enhancement apparatus according to an embodiment of the present disclosure.

FIG. 2 is a structural schematic diagram of an image enhancement apparatus according to an embodiment of the present disclosure. Referring to FIG. 2, the image enhancement apparatus 200 of this embodiment comprises an image acquisition unit 210, a wavelet decomposition unit 220, a wavelet reconstruction unit 230, an edge preserving filtering unit 240, and an integration unit 250. The image enhancement apparatus 200 may perform image enhancement processing on input image using the image enhancement method shown in FIG. 1. The steps of the image enhancement method shown in FIG. 1 will be described in detail below in conjunction with FIG. 2.

In the step 110, the image in the YUV format is acquired.

In some embodiments, the step 110 may be performed by the image acquisition unit 210 in the image enhancement apparatus 200. YUV is a color coding method for an image or video signal, in which Y denotes brightness (Luminance) of the image, U and V denote chrominance (Chroma) of the image. An image obtained by the YUV color coding method is referred to as the image in the YUV format.

In some embodiments, the image input into the image acquisition unit 210 may be in a format of another color space, for example, but not limited to RGB, CMYK, and the like. In these embodiments, an image in another format needs to be converted into one in the YUV format, the conversion step may be performed by the image acquisition unit 210.

The step 110 further comprises separating the acquired image in the YUV format to obtain a brightness component (Y component) and chrominance components (UV components) in the image in the YUV format respectively. This step may be performed by the image acquisition unit 210.

The method for separating the image in the YUV format depends on the specific YUV format. Common YUV formats are, for example, but not limited to, NV12, NV21, YV12, and the like. Different formats correspond to different data storage formats, and when the image data input into the image acquisition unit 210 is read, the brightness component and the chrominance components in the image may be synchronously separated according to the storage format of the image data, and are respectively stored as corresponding amounts for subsequent processing.

In the step 120, N max layers of wavelet decomposition are performed on the brightness component and the chrominance components, respectively.

In some embodiments, the step 120 may be performed by the wavelet decomposition unit 220 in the image enhancement apparatus 200.

After the wavelet decomposition unit 220 performs N max layers of wavelet decomposition on the brightness component and the chrominance components respectively, the low frequency sub-band ($Y\_LL_{level}$) and the high frequency sub-bands ($Y\_LH_{level}$, $Y\_HL_{level}$, $Y\_HH_{level}$) of the brightness component and the low frequency sub-bands ($U\_LL_{level}$, $V\_LL_{level}$) and the high frequency sub-bands ($U\_LH_{level}$, $U\_HL_{level}$, $U\_HH_{level}$, $V\_LH_{level}$, $V\_HL_{level}$, $V\_HH_{level}$) of the chrominance components with respect to each wavelet layer may be obtained, wherein level is a corresponding wavelet layer number, for example, $Y\_LL_N$ is a low frequency sub-band component of the brightness component on an Nth wavelet layer, $U\_LL_N$, $V\_LL_N$ are low frequency sub-band components of the chrominance components on the Nth wavelet layer. N is a positive integer greater than 1.

In some embodiments, the method of the wavelet decomposition may be implemented using any function in a wavelet transformation, for example, but not limited to, a Haar wavelet, a Shannon wavelet, a Meyer wavelet, and the like. In some embodiments of the present disclosure, the wavelet decomposition of the step 120 is performed using the Haar wavelet.

In the step 130, starting from the (N max)th layer, wavelet reconstruction is performed on the low frequency sub-bands of the chrominance components of each layer on which edge preserving filtering has been performed according to the low frequency sub-band of the brightness component of the corresponding layer, and the high frequency sub-bands of the chrominance components continuously towards an upper layer until an image of an original size is obtained. The edge preserving filtering may be various edge preserving filtering algorithms, such as a bilateral filtering algorithm or a guided filtering algorithm. In the embodiment of the present disclosure, the edge preserving filtering algorithm may be the bilateral filtering algorithm, and an image enhancement algorithm in the embodiments of the present disclosure will be described below by taking the bilateral filtering algorithm as an example.

In some embodiments, the step 130 may be performed by the wavelet reconstruction unit 230 in the image enhancement apparatus 200.

In some embodiments, the step of performing edge preserving filtering on the low frequency sub-bands of the chrominance components according to the low frequency sub-band of the brightness component of the corresponding layer comprises: calculating a weight according to the low frequency sub-band of the brightness component of the corresponding layer, and performing edge preserving filtering on the low frequency sub-bands of the chrominance components according to the weight.

In some embodiments, the edge preserving filtering may be performed by the edge preserving filtering unit 240 in the image enhancement apparatus 200.

Specifically, the step 130 is described by taking the bilateral filtering algorithm as an example and taking the Nth wavelet layer (1≤N≤N max, and N is a natural number) as an example. Let the low frequency sub-bands of the chrominance components of a pixel corresponding to the Nth wavelet layer and having a coordinate of (x, y) be $U\_LL_N(x, y)$ and $V\_LL_N(x, y)$, which result in $U\_LL_N^0(x, y)$ and $V\_LL_N^0(x, y)$, respectively, after being subjected to the bilateral filtering denoising. The process of the bilateral filtering may be shown in the following formulas:

$$U\_LL_N^0(x, y) = \frac{\Sigma_{i,j} U\_LL_N(x+i, y+j) * W_N(x+i, y+j)}{\Sigma_{i,j} W_N(x+i, y+j)} \quad (1)$$

$$V\_LL_N^0(x, y) = \frac{\Sigma_{i,j} V\_LL_N(x+i, y+j) * W_N(x+i, y+j)}{\Sigma_{i,j} W_N(x+i, y+j)} \quad (2)$$

where N is a current wavelet layer number, 1≤N≤N max, and N is a natural number, (x,y) is a coordinate of a pixel, (i, j) is an offset in a window, $-WIN_N \leq i,j \leq WIN_N$, $WIN_N$ is a Gaussian kernel radius of the Nth layer, $U\_LL_N(x, y)$ is a low frequency sub-band of a U component pixel (x,y) of the Nth layer, $V\_LL_N(x, y)$ is a low frequency sub-band of a Y component pixel (x,y) of the Nth layer, $U\_LL_N(x+i, y+j)$, $V\_LL_N(x+i, y+j)$ are respectively pixel sets of the U, V component pixels $U\_LL_N(x, y)$, $V\_LL_N(x, y)$ taking the Gaussian kernel size $WIN_N$ as the radius, $W_N(x+i, y+j)$ is a corresponding weight.

In some embodiments, the weight $W_N(x+i, y+j)$ may be calculated according to a domain weight and a range weight. In other embodiments, the weight $W_N(x+i, y+j)$ may also be obtained by calculating ratios of $U\_LL_N(x, y)$, $V\_LL_N(x, y)$, and $Y\_LL_N(x, y)$ to $U\_LL_N(x, y)+V\_LL_N(x, y)+Y\_LL_N(x, y)$. Taking calculating the weight $W_N(x+i, y+j)$ according to the domain weight and the range weight as an example, the step of calculating the weight $W_N(x+i, y+j)$ according to the low frequency sub-band of the brightness component of the corresponding layer may comprise:

$$W_N(x+i,y+j) = WD_N(x+i,y+j) * WR_N(x+i,y+j) \quad (3)$$

where $WD_N(x+i, y+j)$ is the domain weight in the bilateral filtering, and may be calculated by using the following formula:

$$WD_N(x+i, y+j) = \exp\left(-\frac{i^2+j^2}{2\delta\_G_N^2}\right) \quad (4)$$

where $\delta\_G_N$ is a Gaussian kernel variance in an Nth-layer bilateral filtering, $WIN_N$ is the Gaussian kernel radius of the Nth layer, and generally takes a value of a power of 2 such as 1, 2, 4, 8, and the like.

$WR_N(x+i, y+j)$ is the range weight in the bilateral filtering, and may be calculated by using the following formula:

$$WR_N(x+i, y+j) = \begin{cases} EI_N(x+i, y+j) & EI_N(x+i, y+j) > 0 \\ 0 & EI_N(x+i, y+j) \leq 0 \end{cases} \quad (5)$$

where $EI_N(x+i, y+j)$ is a comprehensive edge indicator, and may be calculated by using the following formula:

$$EI_N(x+i, y+J) = 16 - \frac{(Y\_LL_N(x+i, y+j) - Y\_LL_N(x, y))^2}{2\delta\_Y_N^2} -$$
$$\frac{(U\_LL_N(x+i, y+j) - U\_LL_N(x, y))^2}{2\delta\_U_N^2} -$$
$$\frac{(V\_LL_N(x+i, y+j) - V\_LL_N(x, y))^2}{2\delta\_V_N^2} \quad (6)$$

where $\delta\_Y_N$, $\delta\_U_N$ and $\delta\_V_N$ are respectively Y, U, V component variances of the Nth layer, $Y\_LL_N(x, y)$ is a low frequency sub-band of a Y component pixel (x,y) of the Nth layer, $Y\_LL_N(x+i, y+j)$ is a pixel set of the Y component pixel $Y\_LL_N(x, y)$ taking the Gaussian kernel size $WIN_N$ as the radius.

It should be noted that the above five parameters, $WIN_N$, $\delta\_G_N$, $\delta\_Y_N$, $\delta\_U_N$, and $\delta\_V_N$ determine a noise smoothing intensity and an edge preservation level, and the amount of noise depends on a gain value (gain level) used by a camera when acquiring an image. Therefore, values of these five parameters may be determined by establishing mapping relationships between the five parameters and the gain value. After the completion of calibration, five mapping tables may be obtained as shown in the following formulas:

$$WIN_N = WIN\_Table(gain, N)$$

$$\delta\_G_N = \delta\_G\_Table(gain, N)$$

$$\delta\_Y_N = \delta\_Y\_Table(gain, N)$$

$$\delta\_U_N = \delta\_U\_Table(gain, N)$$

$$\delta\_V_N = \delta\_V\_Table(gain, N) \quad (7)$$

When the bilateral filtering is performed on the low frequency sub-bands of the chrominance components of the Nth wavelet layer, the five parameters of $WIN_N$, $\delta\_G_N$, $\delta\_Y_N$, $\delta\_U_N$, and $\delta\_V_N$ corresponding to the Nth wavelet layer are searched for according to the five mapping tables.

It may be understood that the comprehensive edge indicator of the Nth layer $EI_N(x+i, y+j)$ is determined jointly by the low frequency sub-band $Y\_LL_N$ of the corresponding brightness component and the low frequency sub-bands $U\_LL_N$, $V\_LL_N$ of the corresponding chrominance components on the Nth wavelet layer, and is used for the bilateral filtering of the low frequency sub-bands of the corresponding chrominance components on the Nth wavelet layer. The use of the comprehensive edge indicator $EI_N(x+i, y+j)$ enables effective preservation and enhancement of edge information of the low frequency sub-bands of the chrominance components.

With the filtering steps described above, all pixels of the low frequency sub-bands of the chrominance components of the Nth layer may be filtered. After the bilateral filtering of the low frequency sub-bands of the chrominance components of the Nth layer is completed, wavelet reconstruction is performed using $U\_LL_N^0$, $V\_LL_N^0$ and the high frequency sub-bands ($U\_LH_N$, $U\_HL_N$, $U\_HH_N$, $V\_LH_N$, $V\_HL_N$, $V\_HH_N$) of the chrominance components of the Nth layer that are obtained in the step 120, to obtain the low frequency sub-bands $U\_LL_{N-1}$ and $V\_LL_{N-1}$ of the chrominance components of the (N-1)th layer.

Figure 3:
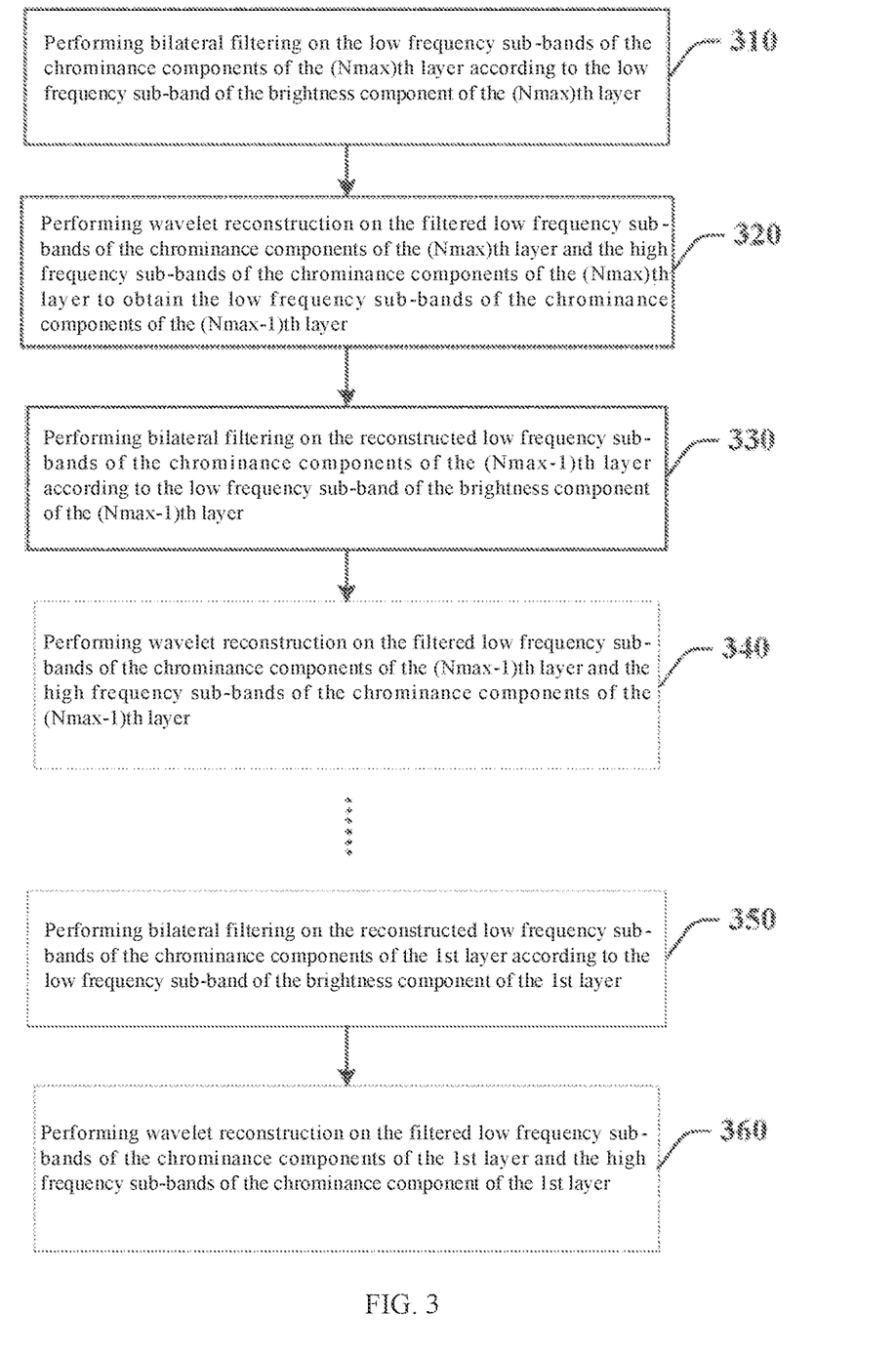
FIG. 3 is a flow diagram of step 130 in the image enhancement method shown in FIG. 1.

FIG. 3 is a flow diagram of a method in the step 130, i.e., starting from the (N max)th layer, performing wavelet reconstruction on the low frequency sub-bands of the chrominance components of each layer on which bilateral filtering has been performed according to the low frequency sub-band of the brightness component of the corresponding layer, and the high frequency sub-bands of the chrominance components continuously towards an upper layer until an image of an original size is obtained. In general, the method comprises: performing bilateral filtering on the low frequency sub-bands of the chrominance components of the (N max)th layer according to the low frequency sub-band of the brightness component of the (N max)th layer; performing wavelet reconstruction on the low frequency sub-bands of the chrominance components and the high frequency sub-bands of the chrominance components of the (N max)th layer towards the (N max-1)th layer to obtain the low frequency sub-bands of the chrominance components of the (N max-1)th layer; performing wavelet reconstruction on the reconstructed low frequency sub-bands of the chrominance components on which bilateral filtering has been performed according to the low frequency sub-band of the brightness component of the corresponding (N max-1)th layer, and the high frequency sub-bands of the chrominance components of the corresponding (N max-1)th layer continuously towards the (N max-2)th layer until an image of an original size is obtained. It could be appreciated that the methods for bilateral filtering and wavelet reconstruction herein are the same as those described above. In some embodiments of the present disclosure, the Haar wavelet is used for the wavelet reconstruction.

Referring to FIG. 3, the method specifically comprises the following steps:

In step 310, the bilateral filtering is performed on the low frequency sub-bands of the chrominance components of the (N max)th layer according to the low frequency sub-band of the brightness component of the (N max)th layer.

In step 320, the wavelet reconstruction is performed on the filtered low frequency sub-bands of the chrominance components of the (N max)th layer and the high frequency sub-bands of the chrominance components of the (N max)th layer to obtain the low frequency sub-bands of the chrominance components of the (N max-1)th layer.

In step 330, the bilateral filtering is performed on the reconstructed low frequency sub-bands of the chrominance components of the (N max-1)th layer according to the low frequency sub-band of the brightness component of the (N max-1)th layer.

In step 340, the wavelet reconstruction is performed on the filtered low frequency sub-bands of the chrominance components of the (N max-1)th layer and the high frequency sub-bands of the chrominance components of the (N max-1)th layer. As for the Nth wavelet layer, when N>1, let N=N-1, and the steps 330 and 340 are repeatedly performed, and step 350 is not continued to perform until N=1.

In the step 350, the bilateral filtering is performed on the reconstructed low frequency sub-bands of the chrominance components of the 1st layer according to the low frequency sub-band of the brightness component of the 1st layer.

In step 360, the wavelet reconstruction is performed on the filtered low frequency sub-bands of the chrominance components of the 1st layer and the high frequency sub-bands of the chrominance component of the 1st layer.

Through the above steps, the bilateral filtering and wavelet reconstruction have been performed on the low frequency sub-bands of the chrominance components of the image in the YUV format on N max scales.

Figure 4:
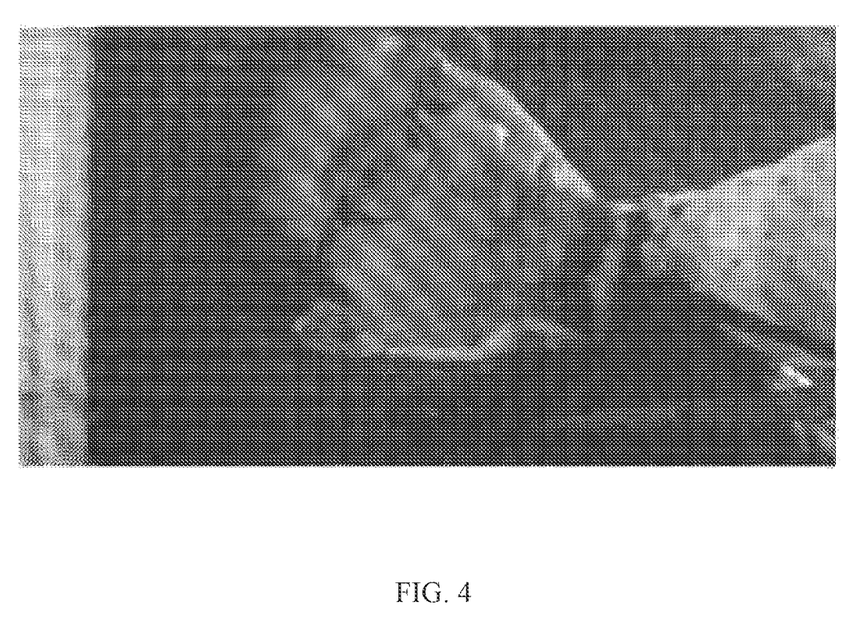
FIG. 4 is an image of an original brightness Y component according to an embodiment of the present disclosure.
Figure 5A:
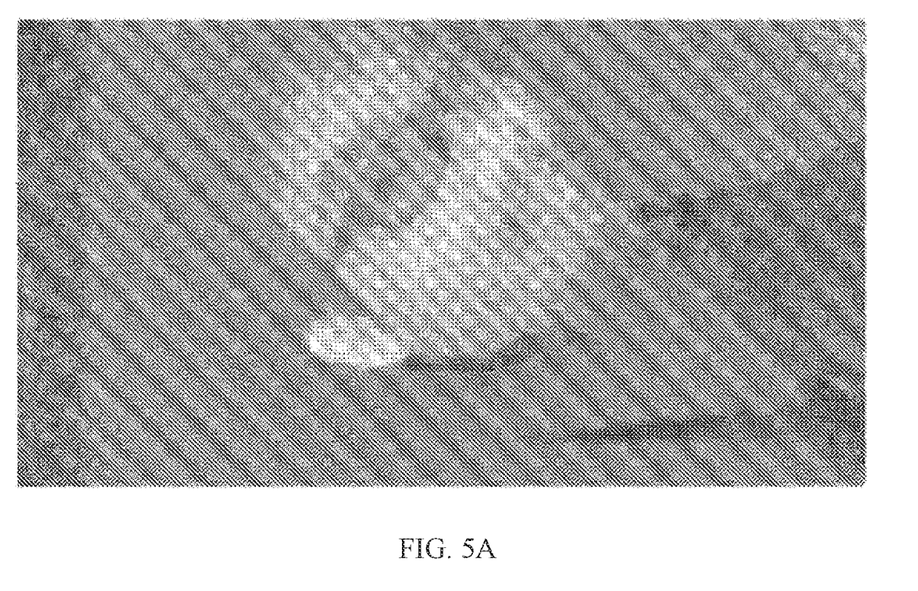
FIG. 5A is an image of an original chrominance U component according to an embodiment of the present disclosure.
Figure 5B:
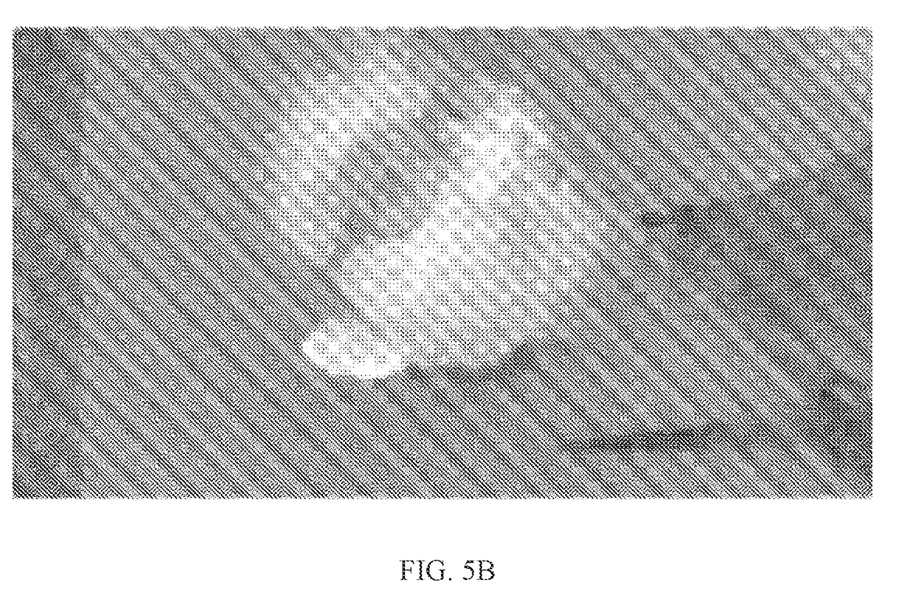
FIG. 5B is an image of a chrominance U component after processed by the image enhancement method according to an embodiment of the present disclosure.
Figure 6A:
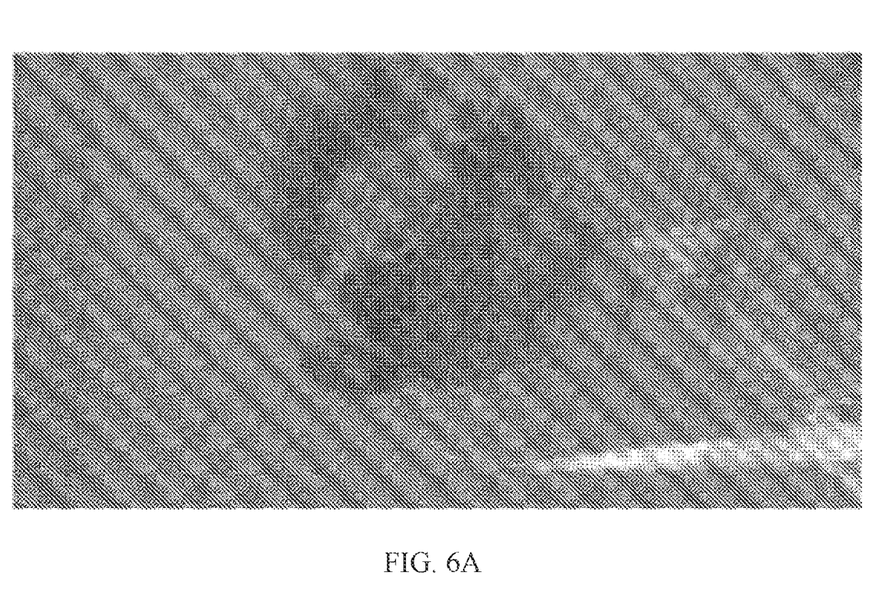
FIG. 6A is an image of an original chrominance V component according to an embodiment of the present disclosure.
Figure 6B:
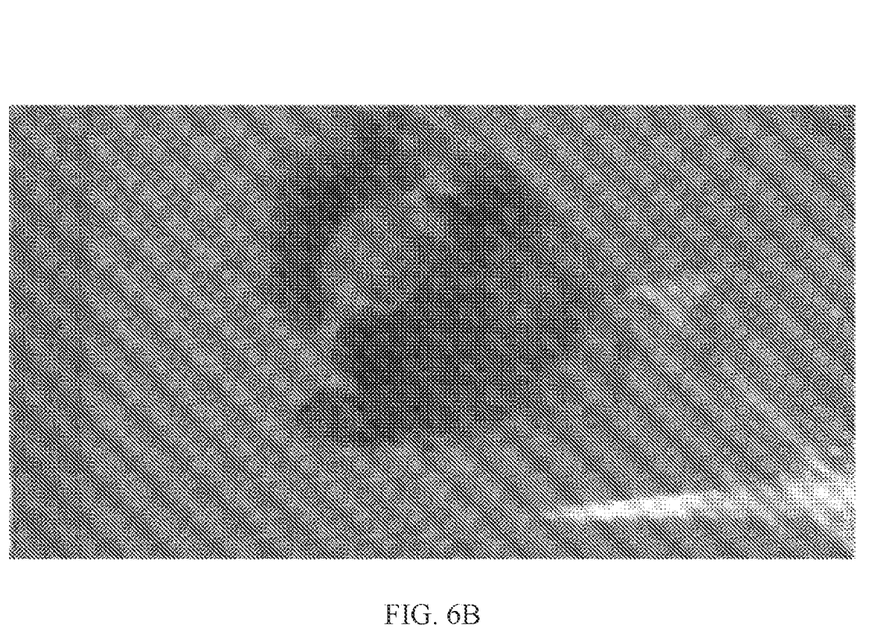
FIG. 6B is an image of a chrominance V component after processed by the image enhancement method according to an embodiment of the present disclosure.

Next, proceeding with the step 140 shown in FIG. 1, the edge preserving filtering is performed on the chrominance components that have been subjected to the wavelet reconstruction according to the brightness component. The brightness component herein refers to the brightness component of the original image in the YUV format that is acquired by the step 110. The chrominance components that have been subjected to the wavelet reconstruction herein are the reconstructed chrominance components obtained in the step 360. In order to visually illustrate the effect of the image enhancement method of the present disclosure, FIGS. 4 to 6B show images before and after image enhancement processing is performed on an exemplary image, respectively. FIG. 4 is an image of an original brightness Y component of an exemplary image. FIG. 5A is an image of an original chrominance U component of the exemplary image; FIG. 5B is an image of a chrominance U component after the image shown in FIG. 5A is processed by using the image enhancement method of an embodiment of the present disclosure. FIG. 6A is an image of an original chrominance V component of the exemplary image; FIG. 6B is an image of a chrominance V component after the image shown in FIG. 6A is processed by using the image enhancement method of an embodiment of the present disclosure. It should be noted that, in order to more clearly show the effect of removing dot-shaped noise, the images shown in FIGS. 5A to 6B are subject to gray scale normalization processing. By comparing FIGS. 5A, 5B and FIGS. 6A, 6B, it may be seen that in the images processed by the image enhancement method of the present disclosure, the dot-shaped noise has been obviously removed, the image effect is significantly improved.

In the step 150, the chrominance components that have been subjected to the edge preserving filtering and the brightness component are integrated.

In some embodiments, the step 150 may be performed by the integration unit 250 in the image enhancement apparatus 200. Similar to the step 110, the process of integrating the chrominance components that have been subjected to the edge preserving filtering and the brightness component also depends on the specific YUV format. The integration unit 250 integrates and outputs the brightness component and the chrominance components in the specific format according to the YUV format required to be output.

If an image format of another color space, for example, but not limited to RGB, CMYK, etc., is required to be output, the integration unit 250 may obtain the image in the YUV format first, and then convert the image in the YUV format into the required image format.

The present disclosure provides an image enhancement method and apparatus, wherein by performing wavelet decomposition on an image in a YUV format to obtain low frequency sub-bands and high frequency sub-bands of a brightness component and chrominance components of each layer, performing edge preserving filtering on the low frequency sub-bands of the chrominance components of each layer according to the low frequency sub-band of the brightness component of the corresponding layer, performing wavelet reconstruction continuously towards an upper layer until an image of an original size is obtained, edge information of the low frequency sub-bands of the chrominance components can be effectively preserved and enhanced, the dependence on thresholds can be avoided, edge oscillations of the image can be eliminated, the denoising effect of image can be improved.

The basic concepts have been described above, and it will be apparent to those skilled in the art that the above disclosure is merely as an example, and does not constitute a limitation of the present disclosure. Although it is not explicitly stated herein, those skilled in the art may make various modifications, improvements and adaptations to the present disclosure. Since such modifications, improvements and adaptations are recommended in the present disclosure, they still fall within the spirit and scope of the exemplary embodiments of the present disclosure.

Meanwhile, the present disclosure has used specific words to describe the embodiments of the present disclosure. For example, "one embodiment," "an embodiment," and/or "some embodiments" mean a certain feature, structure, or characteristic related to at least one embodiment of the present disclosure. Therefore, it should be emphasized and noted that "an embodiment" or "one embodiment" or "an alternative embodiment" mentioned two or more times in different positions in this specification does not necessarily refer to the same embodiment. Furthermore, some features, structures, or characteristics in one or more embodiments of the present disclosure may be appropriately combined.

Although the present disclosure has been described with reference to the present specific embodiments, it will be appreciated by those of ordinary skills in the art that the above embodiments are merely used to illustrate the present disclosure and that various equivalent changes or substitutions may be made without departing from the spirit of the present disclosure, and therefore, all changes and variations to the above embodiments made within the essential spiritual scope of the present disclosure are intended to fall within the scope of the claims of the present application.

What is claimed is:

1. An image enhancement method, comprising:
   acquiring an image in a YUV format, separating a brightness component and chrominance components of the image in the YUV format;
   performing Nmax layers of wavelet decomposition on the brightness component and the chrominance components respectively to obtain, with respect to each layer, low and high frequency sub-bands of the brightness component, and low and high frequency sub-bands of the chrominance components, wherein Nmax is a positive integer greater than 1;
   starting from the (Nmax)th layer, performing wavelet reconstruction on the low frequency sub-bands of the chrominance components of each layer on which edge preserving filtering has been performed according to the low frequency sub-band of the brightness component of the corresponding layer, and the high frequency sub-bands of the chrominance components continuously towards an upper layer until an image of an original size is obtained;
   performing, according to the brightness component, edge preserving filtering on the chrominance components that have been subjected to the wavelet reconstruction; and
   integrating the chrominance components that have been subjected to the edge preserving filtering and the brightness component.

2. The image enhancement method according to claim 1, wherein the step of performing edge preserving filtering on the low frequency sub-bands of the chrominance components according to the low frequency sub-band of the brightness component of the corresponding layer comprises: calculating a weight according to the low frequency sub-band of the brightness component of the corresponding layer, and performing edge preserving filtering on the low frequency sub-bands of the chrominance components according to the weight.

3. The image enhancement method according to claim 2, wherein the chrominance components include a U component and a V component, the edge preserving filtering is bilateral filtering, the step of performing edge preserving filtering on the low frequency sub-bands of the chrominance components according to the weight comprises:

$$U\_LL_N^0(x, y) = \frac{\Sigma_{i,j} U\_LL_N(x+i, y+j) * W_N(x+i, y+j)}{\Sigma_{i,j} W_N(x+i, y+j)} \quad (1)$$

$$V\_LL_N^0(x, y) = \frac{\Sigma_{i,j} V\_LL_N(x+i, y+j) * W_N(x+i, y+j)}{\Sigma_{i,j} W_N(x+i, y+j)} \quad (2)$$

where N is a current wavelet layer number, $1 \leq N \leq Nmax$, and N is a natural number, (x,y) is a coordinate of a pixel, (i,j) is an offset in a window, $-WIN_N \leq i,j \leq WIN_N$, $WIN_N$ is a Gaussian kernel radius of the Nth layer, $U\_LL_N(x, y)$ is a low frequency sub-band of a U component pixel (x,y) of the Nth layer, $V\_LL_N(x, y)$ is a low frequency sub-band of a Y component pixel (x,y) of the Nth layer, $U\_LL_N(x+i, y+j)$, $V\_LL_N(x+1, y+j)$ are respectively pixel sets of the U, V component pixels $U\_LL_N(x, y)$, $V\_LL_N(x, y)$ taking the Gaussian kernel size $WIN_N$ as the radius, $W_N(x+i, y+j)$ is a corresponding weight.

4. The image enhancement method according to claim 3, wherein the step of calculating a weight according to the low frequency sub-band of the brightness component of the corresponding layer comprises:

$$W_N(x+i, y+j) = WD_N(x+i, y+j) * WR_N(x+i, y+j) \quad (3)$$

$$WD_N(x+i, y+j) = \exp\left(-\frac{i^2 + j^2}{2\delta\_G_N^2}\right) \quad (4)$$

$$WR_N(x+i, y+j) = \begin{cases} EI_N(x+i, y+j) & EI_N(x+i, y+j) > 0 \\ 0 & EI_N(x+i, y+j) \leq 0 \end{cases} \quad (5)$$

$$EI_N(x+i, y+j) = 16 - \frac{(Y\_LL_N(x+i, y+j) - Y\_LL_N(x, y))^2}{2\delta\_Y_N^2} - \frac{(U\_LL_N(x+i, y+j) - (U\_LL)_N(x, y))^2}{2\delta\_U_N^2} - \frac{(V\_LL_N(x+i, y+j) - V\_LL_N(x, y))^2}{2\delta\_V_N^2} \quad (6)$$

wherein $\delta\_G_N$ is a Gaussian kernel variance in an Nth-layer bilateral filtering, $\delta\_Y_N, \delta\_U_N$ and $\delta\_V_N$ are respectively Y, U, V component variances of the Nth layer, $WD_N(x+i, y+j)$ is a domain weight in the bilateral filtering, $WR_N(x+i, y+j)$ is a range weight in the bilateral filtering, $EI_N(x+i, y+j)$ is a comprehensive edge indicator, $Y\_LL_N(x, y)$ is a low frequency sub-band of a Y component pixel (x,y) of the Nth layer, $Y\_LL_N(x+i, y+j)$ is a pixel set of the Y component pixel $Y\_LL_N(x, y)$ taking the Gaussian kernel size $WIN_N$ as the radius.

5. The image enhancement method according to claim 1, wherein the step of acquiring an image in a YUV format comprises: acquiring an image in a RGB format, and converting the image in the RGB format into the image in the YUV format.

6. The image enhancement method according to claim 1, wherein a Haar wavelet function is used for the wavelet decomposition and the wavelet reconstruction.

7. An image enhancement apparatus, comprising:
a processor; and
a memory that stores computer readable instructions which, when executed by the processor, cause the processor to perform the image enhancement method according to claim 1.

8. An image enhancement apparatus, comprising:
an image acquisition unit configured to acquire an image in a YUV format and separate a brightness component and chrominance components of the image in the YUV format;
a wavelet decomposition unit configured to perform N layers of wavelet decomposition on the brightness component and the chrominance components respectively to obtain, with respect to each layer, low and high frequency sub-bands of the brightness component, and low and high frequency sub-bands of the chrominance components, wherein N is a positive integer greater than 1;
a wavelet reconstruction unit configured to, starting from the (Nmax)th layer, perform wavelet reconstruction on the low frequency sub-bands of the chrominance components of each layer on which edge preserving filtering has been performed according to the low frequency sub-band of the brightness component of the corresponding layer, and the high frequency sub-bands of the chrominance components continuously towards an upper layer until an image of an original size is obtained;
an edge preserving filtering unit configured to perform, according to the brightness component, edge preserving filtering on the chrominance components that have been subjected to the wavelet reconstruction; and
an integration unit configured to integrate the chrominance components that have been subjected to the edge preserving filtering and the brightness component.

9. The image enhancement apparatus according to claim 8, wherein the wavelet reconstruction unit is configured to calculate a weight according to the low frequency sub-band of the brightness component of the corresponding layer, and perform edge preserving filtering on the low frequency sub-bands of the chrominance components according to the weight.

10. The image enhancement apparatus according to claim 8, wherein the image acquisition unit is configured to acquire an image in a RGB format, and converts the image in the RGB format into the image in the YUV format.

11. The image enhancement apparatus according to claim 8, wherein the wavelet decomposition unit is configured to perform the wavelet decomposition by using a Haar wavelet function, the wavelet reconstruction unit is configured to performs the wavelet reconstruction by using the Haar wavelet function.

* * * * *